No. 869,063. PATENTED OCT. 22, 1907.
J. CRYER.
CUTTING TOOL.
APPLICATION FILED JULY 22, 1907.
Fig. 1
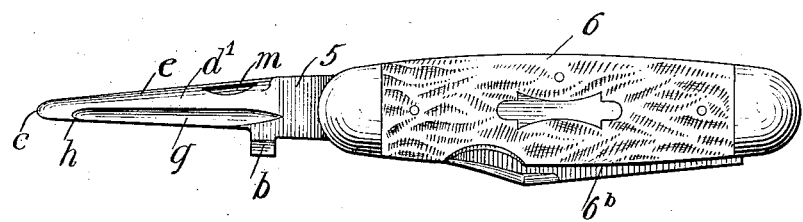
Fig. 2
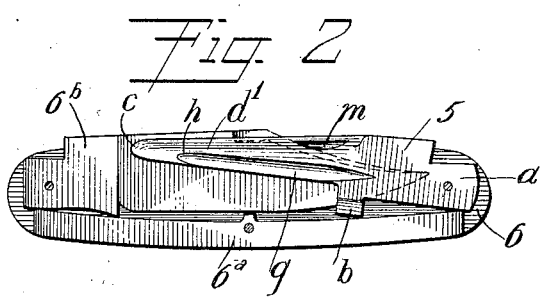
Fig. 3
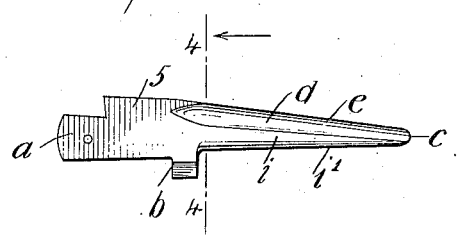
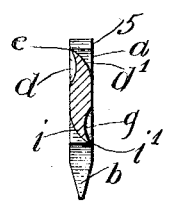
Fig. 4
WITNESSES
E. G. Bromley
Wm P Patton
INVENTOR
James Cryer.
BY Munn & Co
ATTORNEYS

UNITED STATES PATENT OFFICE.

JAMES CRYER, OF WALDEN, NEW YORK, ASSIGNOR TO WARWICK KNIFE COMPANY, OF WARWICK, NEW YORK.

CUTTING-TOOL.

No. 869,063.  Specification of Letters Patent.  Patented Oct. 22, 1907.

Application filed July 22, 1907. Serial No. 384,865.

*To all whom it may concern:*

Be it known that I, JAMES CRYER, a citizen of the United States, and a resident of Walden, in the county of Orange and State of New York, have invented a new and Improved Cutting-Tool, of which the following is a full, clear, and exact description.

The purpose of this invention is to produce from a single piece of steel or other suitable metal, a tool having peculiar, novel form that adapts the device for effective service as a boring tool, a taper reamer and a scraper; and that may be held for service in a handle along with a knife blade, or be mounted on a fixed handle as may be preferred.

The invention consists in the novel construction of the improved cutting tool, and its embodiment with a handle that supports it for service in either function specified.

Reference is to be had to the accompanying drawings forming a part of this specification, in which similar characters of reference indicate corresponding parts in all the views.

Figure 1 is a side view of the improved tool extended from a knife handle that contains a cutting blade. Fig. 2 is a side view of the improved tool folded in the knife handle, a side wall of the latter being removed to expose the knife blade and tool. Fig. 3 is a detached side view of the improvement showing the peculiar formation of the side thereof which is opposite from that represented in Figs. 1 and 2, and Fig. 4 is a transverse sectional view of the tool substantially on the line 4—4 in Fig. 3.

The improvement as represented comprises a flat blade 5 preferably of fine steel, which will receive sharp cutting edges, and for convenience in mounting the same upon a handle such as 6, one end $a$ of the blade 5, is shaped similarly to the heel on a pocket knife blade. A portion of the blade 5, that extends from the end of the heel thereof to a lateral projection $b$, has parallel edges and from said projection toward the other end $c$ of the blade, the edges thereof converge somewhat. The lateral projection $b$ is rectangular in contour and tapers laterally toward its free end, which adapts it for service as a screw driver. The free end $c$ of the blade is convexed on the edge, and of a suitable width for efficient service, as will presently be explained. From the end $c$ toward the heel $a$ along the edge that is opposite from that whereon the projection $b$ is formed, a concave channel $d$ is produced, and on the opposite side $d^1$, the material is rendered convex, thus producing a sharp cutting edge $e$ that is curved laterally, as shown in Fig. 4. Upon the same side of the blade that has the convex formation $d'$ and along the opposite edge thereof, starting above the projection $b$, a concave channel $g$ is formed, which extends to a point $h$, near the free end $c$. Opposite the concave channel the material along the edge is convexed, as at $i$, thus affording a sharp edge $i'$, that is the counterpart of the cutting edge $e$, but as shown in Fig. 4, curves laterally in an opposite direction.

It will be seen that the convexity of the side surface $d$ extends to the convexed end $c$, and thus gives a gouge shape to this end, that is tapered laterally to a sharp edge. It will also be evident that the cutting edges $e$ and $i'$, that converge from their rear ends toward the convex end $c$, each afford a shear cut when the tool is rotated, so that they are adapted to ream a small hole formed by the end $c$, to any diameter within the range of the tool and produce a smooth circular hole.

While the tool may be secured by its heel upon any suitable handle, so as to project therefrom in condition for use, it is preferred to pivot the blade 5 at its heel $a$ between the side walls of a knife handle 6, having the usual spring back $6^a$, and may also contain a cutting blade $6^b$ pivoted similarly at the opposite end of the handle.

The tool when pivoted in the handle 6, is provided with a nail kerf $m$, which facilitates the opening out of said tool for use; and obviously either the tool or blade. $6^b$ may be extended and held stationary on the handle 6 by the pressure of the spring back $6^a$, that operates in the ordinary manner for retaining the pivoted blades in open or closed adjustment.

The improvement has a wide range of usefulness, as it may be advantageously employed for forming lacing holes in machine belts, the end $c$, as shaped, enabling a hole to be quickly formed in a leather or canvas belt in an obvious manner. Furthermore, the holes in belts or other material of a similar nature may be readily enlarged by use of the improved tool.

As a scraper the cutting edges $e$ and $i'$ may be advantageously employed for removal of insulating material on electric wires, and the bared ends may be speedily brightened for soldering by using the edges named for that purpose.

The device is also available for use as a tool for boring smooth holes in the bark of trees, in making birch bark canoes, berry vessels, sap troughs and the like. It will also enable the mending of sails by use of the clean cutting rotatable punch.

The screw-driver may be of service in many cases of emergency and is a useful adjunct to the improved tool.

Having thus described my invention, I claim as new and desire to secure by Letters Patent:

1. A tool for forming holes, consisting of a flat blade tapered on its edges toward one end, said end being convexed at its transverse edge, and the tapered edges having laterally-turned cutters thereon which project in opposite directions and merge into the convexed end that is sharp on the edge.

2. A tool for forming and reaming holes in pliable material, comprising a flat blade adapted for pivoting at one end on a handle and tapered on the edges to its free end which is convexed and sharpened, each edge being concave-channeled on one side and convexed on the opposite side, forming cutters that are shear cutting and trend at opposite sides of the blade.

3. The combination with a suitable handle, having a spring back, of a tool for boring holes and reaming said holes in pliable material, consisting of a flat blade formed with a heel at one end which is pivoted upon an end of the handle and is foldable therein, said blade having tapered edges, that are concaved on one side and convexed on the opposite side, forming laterally turned cutters that trend from opposite sides of the blade, said edges merging into the free end of the blade, which is gouge shaped and sharpened on its transverse edge.

In testimony whereof I have signed my name to this specification in the presence of two subscribing witnesses.

JAMES CRYER.

Witnesses:
A. S. EMBLER,
H. W. MILLSPAUGH.